W. F. MUEHL.
DIFFERENTIAL GEARING FOR AUTOMOBILES.
APPLICATION FILED MAY 10, 1913.

1,090,082.

Patented Mar. 10, 1914.

2 SHEETS—SHEET 1.

Witnesses
Frank R. Glore
Chas. W. Gerard

Inventor
W<sup>m</sup> F. Muehl
By George F. Thorpe Atty.

W. F. MUEHL.
DIFFERENTIAL GEARING FOR AUTOMOBILES.
APPLICATION FILED MAY 10, 1913.
1,090,082.
Patented Mar. 10, 1914.
2 SHEETS—SHEET 2.
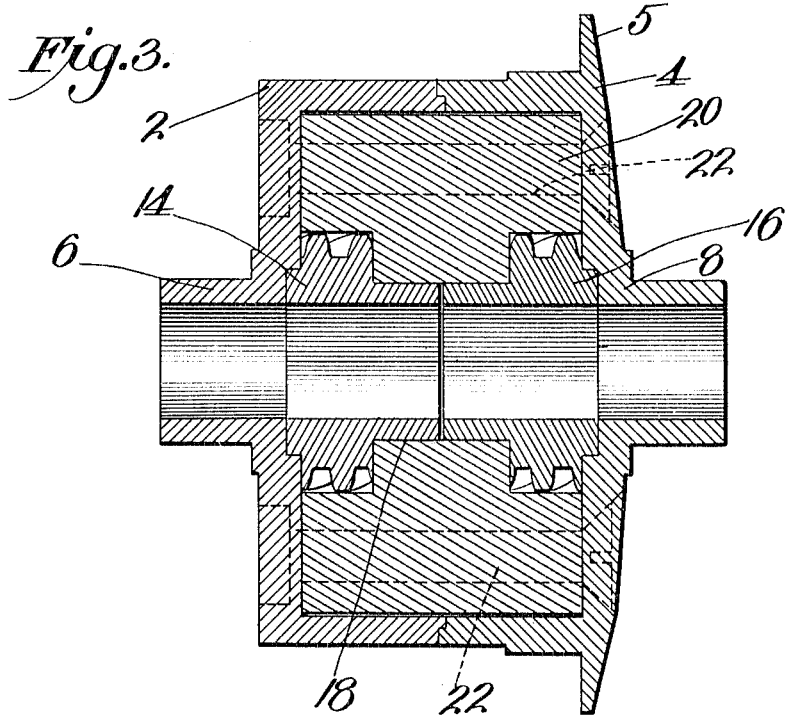
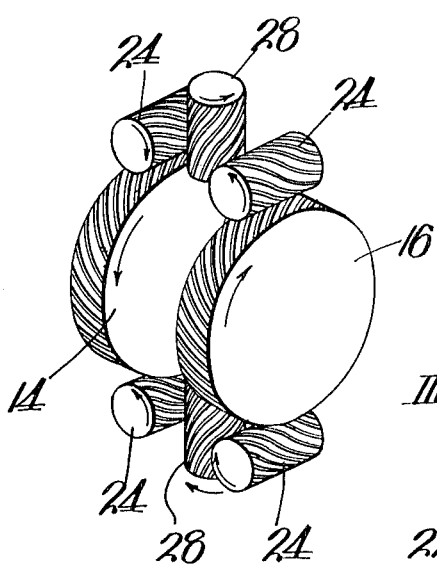
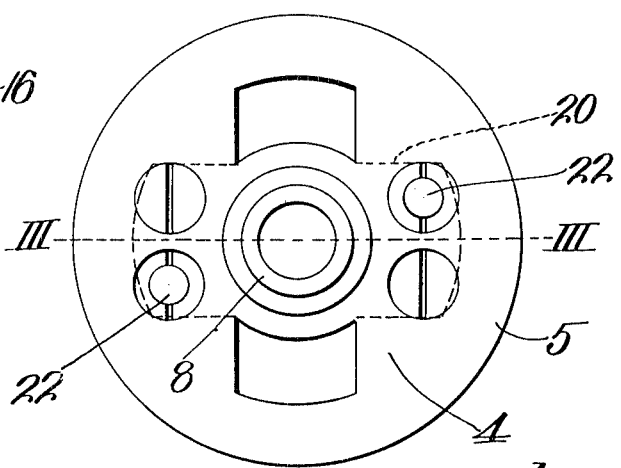
Witnesses
Frank R Glor
Chas. W. Girard
Inventor
Wm. F. Muehl
By George H. Thorpe Atty.

UNITED STATES PATENT OFFICE.

WILLIAM F. MUEHL, OF CHICAGO, ILLINOIS, ASSIGNOR OF ONE-THIRD TO LEWIS H. SCURLOCK, OF KANSAS CITY, MISSOURI, AND ONE-THIRD TO C. C. WOLF, OF PARKERSBURG, IOWA.

DIFFERENTIAL GEARING FOR AUTOMOBILES.

1,090,082.   Specification of Letters Patent.   Patented Mar. 10, 1914.

Application filed May 10, 1913. Serial No. 766,887.

*To all whom it may concern:*

Be it known that I, WILLIAM F. MUEHL, a citizen of the United States, residing at Chicago, in the county of Cook and State of Illinois, have invented certain new and useful Improvements in Differential Gearing for Automobiles, of which the following is a specification.

This invention relates to differential gearing designed particularly for motor propelled vehicle transmission mechanism and my purpose is to devise a gearing which will drive the wheels on both sides of the automobile equally at all times and under all conditions. I accomplish this by means of a gearing constructed so as to transmit driving action equally to both wheels at all times when the transmission mechanism is clutched with the engine and the latter is running, which gearing however will also act to transmit the necessary differentiating motion between the wheels under all conditions requiring it, as when the car is deviating from a straight line.

To these ends the invention consists in certain novel and peculiar features of construction and organization as hereinafter described and claimed; and in order that it may be fully understood reference is to be had to the accompanying drawings, in which—

Figure 1:
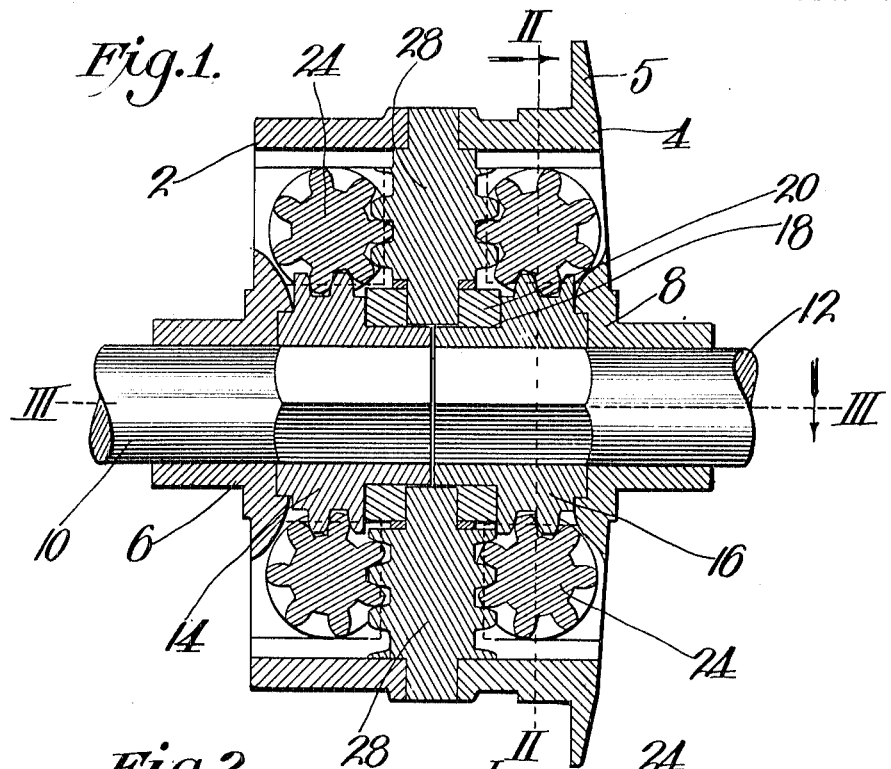
Figure 2:
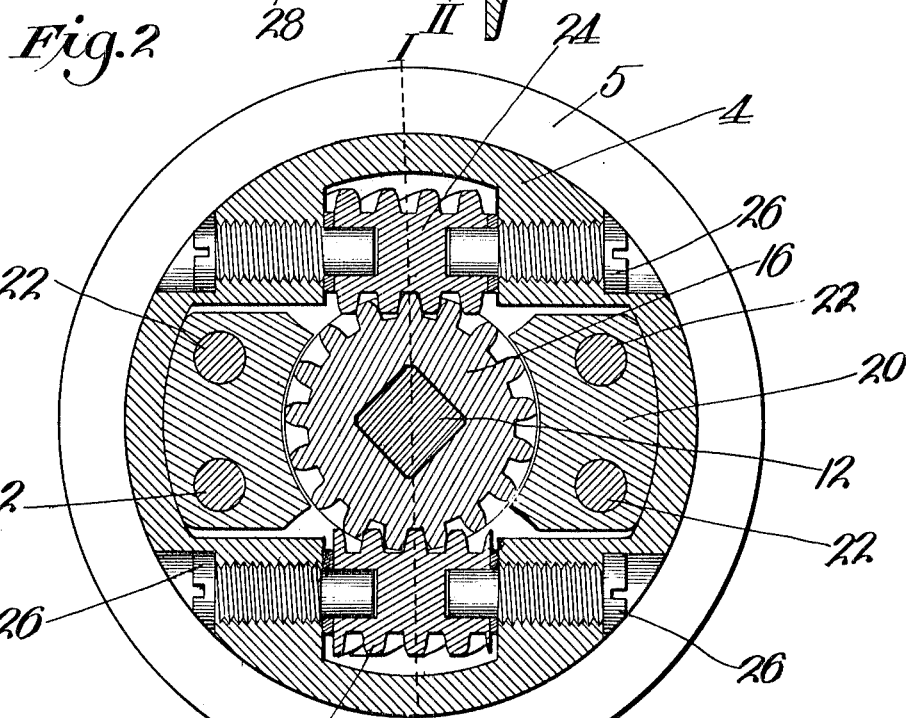

Figure 1, is a vertical section through a gearing constructed in accordance with my invention, on the line I—I of Fig. 2. Fig. 2, is a vertical section along the line II—II of Fig. 1. Fig. 3, is a horizontal section on the line III—III of Fig. 1, with the sectional rear axle or shaft omitted. Fig. 4, is a perspective view showing the relative position of the gears, and the direction which the teeth of the various gears extend, but omitting the actual teeth. Fig. 5, is a view in elevation of one side of the housing.

Referring to the drawings, the housing for the gearing comprises two step-jointed sections 2 and 4 provided with bearings 6 and 8 respectively, for the alined shaft ends 10 and 12, as for example the ends of a sectional rear wheel shaft or axle of a motor car. The section 4 of the housing has a flange 5 formed thereon on which to mount the master gear (not shown) to be driven from the engine. The inner terminals of the shaft ends are squared to receive correspondingly bored spiral gears 14 and 16, the teeth of which are of forty-five degree pitch. The hubs of the gears 14 and 16 are journaled at their outer ends in the housing sections and at their inner ends in a central opening 18, in a block 20, which is secured in place between and within the housing sections by means of bolts 22.

Intermeshing with each of the gears 14 and 16 is a pair of forty five degree spiral gears 24 which are journaled on trunnions formed upon the ends of screw studs 26 carried by the housing sections and countersunk therein. These gears 24 are positioned at diametrically opposite points with reference to the gear 14 or 16 with which they mesh, and said gears 24 also mesh with radially arranged forty-five degree spiral gears 28 journaled at their opposite ends in the housing and in the block 20. It will thus be seen that the gears 28 also move with the housing and that each gear 28 coöperates with one of each pair of gears 24 meshing with the gears 14 and 16.

When the housing is turned by the engine drive through the master gear, the gears 24 and 28 have no rotary movement about their own axes so long as the car is traveling in a straight line, but lock together by a thrust lock and merely revolve about the axes of the shafts 10 and 12, thereby rotating the gears 14 and 16 and turning the wheel shaft or axle. When, however, the car deviates from this straight line movement so that the gear 16, say, of the outside wheel will turn more rapidly than the housing, this acceleration will be compensated for by a corresponding retardation in the movement of the inner gear 14 of the inside wheel. This is accomplished by the turning of gears 24 and 28 connecting the gears 14 and 16 and so arranged that forward movement of one of said gears 14 or 16 tends to effect a backward movement of the other, as will be observed from the arrows indicating the relative turning movements of the different gears, all this taking place while power is being continuously applied to both wheels. In other words, while power is transmitted equally from the engine drive to both wheels, the retarding wheel while making a turn thrusts power to the advancing wheel in exact proportion to the radius of the turn.

An advantage of immense importance which this construction has over the ordinary differential gearing lies in the fact that power is continuously applied to both wheels, either of which may be driven regardless of whether or not the other has lost its tractive force. In the ordinary differential gearing, when traction of one of the wheels of the car is lost, as in encountering a slippery piece of ground, the car cannot move on because each wheel depends upon the other as its fulcrum of resistance. In the present structure, by interposing the system of spiral gears 24 and 28 between the gears 14 and 16, power is transmitted to each wheel equally under all circumstances, and should either wheel have lost its traction the arrangement of the intermediate gearing is such as to form a lock against turning and still afford a fulcrum of resistance sufficient to maintain the traction of the other wheel.

My differential construction is of further very great advantage in overcoming the objectionable acceleration of the wheel which happens to strike a stone or bump and is thereby thrown off the ground momentarily. When a wheel is so accelerated, it must of course on returning to the surface slow up to conform to the normal speed of the car, which causes excessive tire wear as well as uneven traction or lurching of the car from one side of the road to the other. This is overcome in a practical way in my differential gearing because, with both wheels driving at equal speed at all times, either wheel is prevented by the intermediate spiral gear arrangement from acceleration above the speed of the other wheel under such conditions as those described. It is further found that when the car is at rest and the engine unclutched either of the wheels may be jacked off the ground and turned forward or reversed without affecting the other wheel, so that repairs may be made upon the same as readily as with wheels connected by the ordinary differential gearing.

From the foregoing it will be apparent that I have produced a differential gearing embodying the features of advantage enumerated as desirable in the statement of the object of the invention and while the above represents one embodiment of the same, I do not wish to be restricted to the precise construction and arrangement shown, but reserve the right to such changes and modifications as fall within the spirit and scope of the appended claims.

I claim—

1. In differential gearing, a driving member, a pair of driven members, and driving connections between said driving and driven members, said connections comprising a housing and spiral gears journaled in the housing, meshing with the driven members, and other spiral gears at right angles to the first mentioned gears and meshing therewith.

2. In differential gearing, a driving member, a pair of driven members, differential means between said driven members, comprising a housing and spiral gears journaled in the housing, meshing with the driven members, and other spiral gears arranged at an angle to the first mentioned gears and meshing therewith.

3. In a differential gearing, a rotating housing, a pair of driven spiral gears mounted within the housing, and differentiating means connected to said housing and acting to transmit power from said housing equally to both of said driven spiral gears to rotate the latter irrespective of inequalities in their loads, said differentiating means comprising a set of three spiral gears.

4. In a differential gearing, a housing, a pair of driven shafts, spiral gears mounted thereon within the housing, and differentiating means connected to said housing and acting to transmit power from said housing equally to both of said spiral gears to rotate the shafts irrespective of inequalities in their loads, said differentiating means comprising six spiral gears.

5. In a differential gearing, a housing, a pair of driven members mounted in said housing, and gear connections between said housing and members, said connections comprising spiral gears journaled in the housing and meshing with the driven members, and other spiral gears at right angles to the first mentioned gears and meshing therewith.

6. In a differential gearing, a housing, shaft bearings in said housing, a pair of shafts journaled in said bearings, spiral gears fixed to said shafts, spiral gears mounted in the housing for rotation about axes at right angles to said shafts and meshing with said shaft gears, and spiral gears carried by said housing for rotation about axes at right angles to the axes of said second set of gears and meshing therewith, whereby equal power is transmitted to said shafts and simultaneously differential movement of the latter is permitted.

7. In a differential gearing, a housing, shaft bearings in said housing, a pair of shafts journaled in said bearings, spiral gears fixed to said shafts, spiral gears mounted in the housing for rotation about axes at right angles to said shafts and meshing with said shaft gears, and spiral gears carried by said housing for rotation about axes at right angles to the axes of said second set of gears and meshing therewith, whereby equal power is transmitted to said shafts and simultaneously differential movement of the latter is permitted, irrespective of the resistance offered thereby.

In testimony whereof, I affix my signature, in the presence of two witnesses.

WILLIAM F. MUEHL.

Witnesses:
 CHAS. O. GERARD,
 G. Y. THORPE.